United States Patent
Ichinokawa

(10) Patent No.: US 11,274,934 B2
(45) Date of Patent: Mar. 15, 2022

(54) INFORMATION OUTPUT DEVICE, OUTPUT CONTROL METHOD, AND STORAGE MEDIUM

(71) Applicant: HONDA MOTOR CO., LTD., Tokyo (JP)

(72) Inventor: Jumpei Ichinokawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 119 days.

(21) Appl. No.: 16/680,545

(22) Filed: Nov. 12, 2019

(65) Prior Publication Data
US 2020/0166362 A1 May 28, 2020

(30) Foreign Application Priority Data

Nov. 26, 2018 (JP) .............................. JP2018-220698

(51) Int. Cl.
*G01C 21/36* (2006.01)
*G06K 9/00* (2022.01)

(52) U.S. Cl.
CPC ..... *G01C 21/3602* (2013.01); *G01C 21/3605* (2013.01); *G01C 21/3635* (2013.01); *G06K 9/00798* (2013.01)

(58) Field of Classification Search
USPC ....................................................... 701/410
See application file for complete search history.

(56) References Cited

U.S. PATENT DOCUMENTS

| | | | | |
|---|---|---|---|---|
| 6,466,867 B1 * | 10/2002 | Sakashita | ........... | G01C 21/3626 701/437 |
| 2016/0341561 A1 * | 11/2016 | Woolley | ............. | G01C 21/3658 |
| 2018/0217604 A1 * | 8/2018 | Nakajima | ............ | G05D 1/0088 |
| 2018/0242115 A1 * | 8/2018 | Kim | ........................ | H04W 4/40 |
| 2020/0166362 A1 * | 5/2020 | Ichinokawa | ....... | G01C 21/3658 |

FOREIGN PATENT DOCUMENTS

| | | |
|---|---|---|
| JP | 10-019584 | 1/1998 |
| JP | 2000-266556 | 9/2000 |
| JP | 2001-304903 | 10/2001 |
| JP | 2011-137723 | 7/2011 |
| JP | 2012-107894 | 6/2012 |
| JP | 2017/017761 | 2/2017 |
| WO | 2017/017761 | 2/2017 |

OTHER PUBLICATIONS

Japanese Office Action for Japanese Patent Application No. 2018-220698 dated Nov. 2, 2021.

* cited by examiner

*Primary Examiner* — Tyler D Paige

(74) *Attorney, Agent, or Firm* — Amin, Turocy & Watson, LLP

(57) ABSTRACT

An information output device includes a route acquirer configured to acquire a route to a destination of a vehicle, an output configured to output information, and an output controller configured to cause the output to output guidance information for guiding an occupant to make a lane change to a recommended lane associated with the route to the destination acquired by the route acquirer. When a travel lane of the vehicle is a merging lane that merges with a first road and a distance from a point at which the travel lane merges with the first road to a point at which the lane change is required is less than or equal to a first prescribed distance, the output controller causes the output to output the guidance information before the vehicle joins the first road.

12 Claims, 11 Drawing Sheets

INFORMATION OUTPUT DEVICE, OUTPUT CONTROL METHOD, AND STORAGE MEDIUM

CROSS-REFERENCE TO RELATED APPLICATION

Priority is claimed on Japanese Patent Application No. 2018-220698, filed Nov. 26, 2018, the content of which is incorporated herein by reference.

BACKGROUND

Field of the Invention

The present invention relates to an information output device, an output control method, and a storage medium.

Description of Related Art

Conventionally, there is a driving assistance system for assisting driving of a driver by displaying a route to a destination on a screen. In this regard, there is technology for calculating a timing at which guidance for a lane change will be provided on the basis of a no-lane-change zone or the number of lanes of a road on which a vehicle will travel and providing the guidance for the lane change on the basis of the calculated timing (for example, Japanese Unexamined Patent Application, First Publication No. 2012-107894).

SUMMARY

However, in the conventional technology, an occupant may not be notified of guidance information about a lane change at an appropriate timing according to a road shape and a travel situation of a vehicle.

An aspect of the present invention has been made in view of such circumstances, and an objective of the present invention is to provide an information output device, an output control method, and a storage medium capable of outputting guidance information about a lane change at a more appropriate timing.

An information output device, an output control method, and a storage medium according to the present invention adopt the following configurations.

(1): According to an aspect of the present invention, there is provided an information output device including: a route acquirer configured to acquire a route to a destination of a vehicle; an output configured to output information; and an output controller configured to cause the output to output guidance information for guiding an occupant to make a lane change to a recommended lane associated with the route to the destination acquired by the route acquirer, wherein, when a travel lane of the vehicle is a merging lane that merges with a first road and a distance from a point at which the travel lane merges with the first road to a point at which the lane change is required is less than or equal to a first prescribed distance, the output controller causes the output to output the guidance information before the vehicle joins the first road.

(2): In the above-described aspect (1), a lane connected to the merging lane included in the first road is a lane connected to a branch lane that branches from the first road.

(3): In the above-describes aspect (2), when a distance from a point at which the merging lane merges with the first road to a point at which the branch lane branches from the first road is less than or equal to a second prescribed distance, the output controller causes the output to output the guidance information before the vehicle joins the first road.

(4): In the above-describes aspect (2), when the merging lane is a lane with prescribed curvature for connecting the first road and a second road which three-dimensionally intersects the first road and a distance in a direction in which the second road of the merging lane is extended is greater than a distance in a direction in which the first road of the merging lane and the branch lane is extended, the output controller causes the output to output the guidance information before the vehicle joins the first road.

(5): In the above-describes aspect (4), when the branch lane is a lane with prescribed curvature connected to a lane included in the second road after branching from the first road, the output controller further causes the output to output the guidance information before the vehicle joins the first road.

(6): In the above-describes aspect (1), the information output device further includes a recognizer configured to recognize a travel situation of the vehicle, wherein the output controller causes the output to output the guidance information when a forward direction of the vehicle which is traveling in the merging lane recognized by the recognizer is at a prescribed angle with respect to an extending direction of the first road.

(7): According to an aspect of the present invention, there is provided an information output device including: a route acquirer configured to acquire a route to a destination of a vehicle; an output configured to output information; and an output controller configured to cause the output to output guidance information for guiding an occupant to make a lane change to a recommended lane associated with the route to the destination acquired by the route acquirer, wherein, when a travel lane of the vehicle is a merging lane that merges with a first road and a lane included in the first road connected to the merging lane included in the first road is a lane connected to a branch lane that branches from the first road, the output controller derives a distance from a point at which the merging lane merges with the first road to a point at which the branch lane branches from the first road, and wherein, when the derived distance is within a prescribed distance, the output controller causes the output to output the guidance information before the vehicle joins the first road.

(8): According to an aspect of the present invention, there is provided an information output device including: a route acquirer configured to acquire a route to a destination of a vehicle; an output configured to output information; and an output controller configured to cause the output to output guidance information for guiding an occupant to make a lane change to a recommended lane associated with the route to the destination acquired by the route acquirer, wherein, when a travel lane of the vehicle is a merging lane that merges with a first road, the merging lane is a lane for connecting the first road and a second road which three-dimensionally intersects the first road, a lane connected to the merging lane included in the first road is a lane connected to a branch lane that branches from the first road, a distance in a direction in which the second road of the merging lane is extended is greater than a distance in a direction in which the first road of the merging lane and the branch lane is extended, the output controller causes the output to output the guidance information before the vehicle joins the first road.

(9): According to an aspect of the present invention, there is provided an output control method including: acquiring, by a computer, a route to a destination of a vehicle; causing, by the computer, an output to output guidance information for guiding an occupant to make a lane change to a recommended lane associated with the acquired route to the destination; and causing, by the computer, when a travel lane of the vehicle is a merging lane that merges with a first road and a distance from a point at which the travel lane merges with the first road to a point at which the lane change is required is less than or equal to a first prescribed distance, the output to output the guidance information before the vehicle joins the first road.

(10): According to an aspect of the present invention, there is provided a computer-readable non-transitory storage medium storing a program for causing a computer to: acquire a route to a destination of a vehicle; cause an output to output guidance information for guiding an occupant to make a lane change to a recommended lane associated with the acquired route to the destination; and cause, when a travel lane of the vehicle is a merging lane that merges with a first road and a distance from a point at which the travel lane merges with the first road to a point at which the lane change is required is less than or equal to a first prescribed distance, the output to output the guidance information before the vehicle joins the first road.

According to the above-described aspects (1) to (10), it is possible to output guidance information about a lane change at a more appropriate timing.

DESCRIPTION OF EMBODIMENTS

Hereinafter, embodiments of an information output device, an output control method, and a storage medium according to the present invention will be described with reference to the drawings. In the embodiment, as an example in which the information output device is mounted in a vehicle including a driving assistance device such as an advanced driver assistance system (ADAS) or a navigation device for the guidance of a route to a destination will be described. Driving assistance systems in the embodiment include, for example, an adaptive cruise control (ACC) system, a lane keep assistance system (LKAS), a collision mitigation brake system (CMBS), and the like. Hereinafter, although a case in which left-hand traffic regulations are applied will be described, it is only necessary to reverse left and right when right-hand traffic regulations are applied.

Overall Configuration

Figure 1:
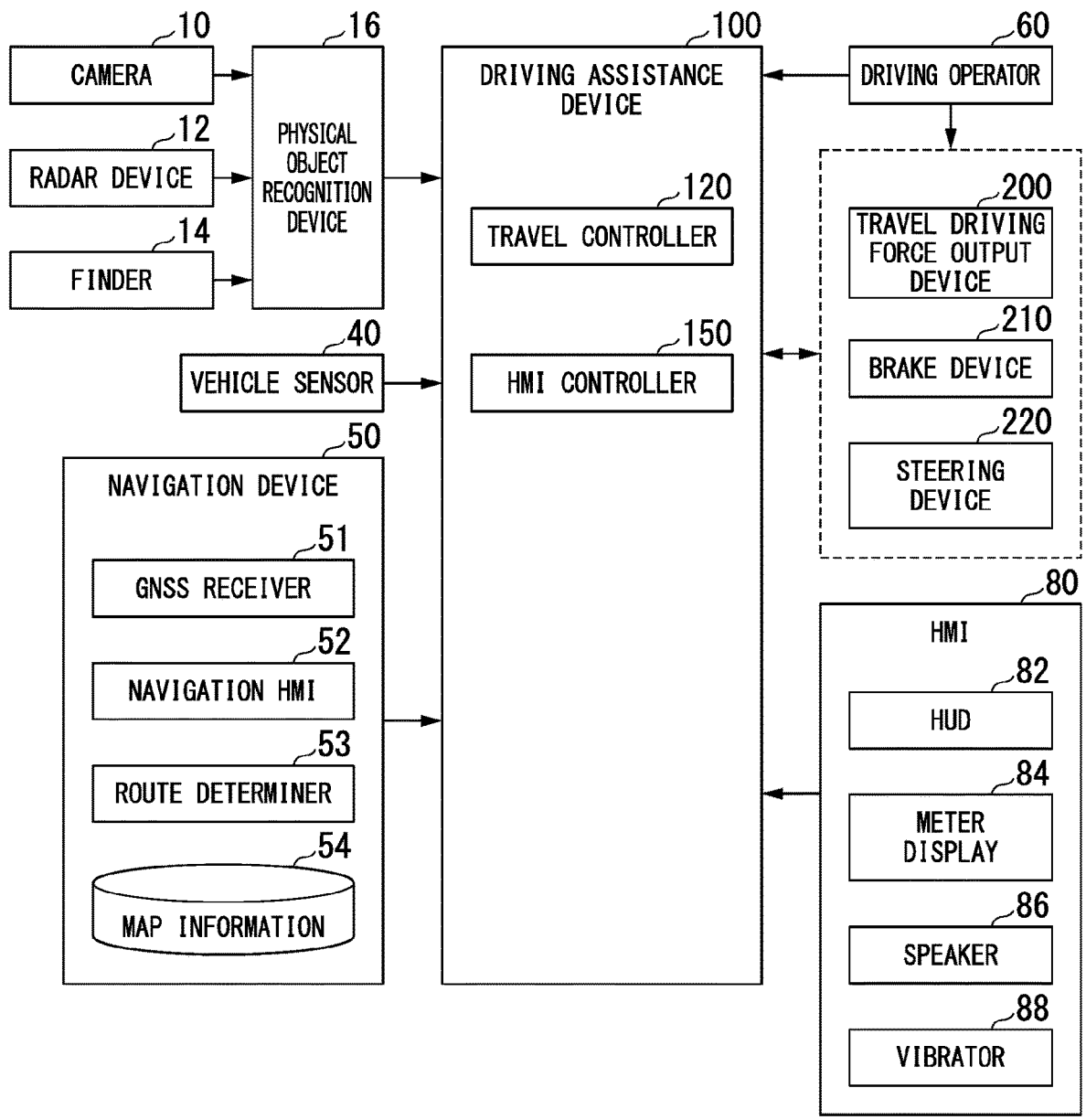
FIG. 1 is a configuration diagram of a vehicle system including an information output device of an embodiment.

FIG. 1 is a configuration diagram of a vehicle system 1 using a vehicle control device according to an embodiment. For example, a vehicle (hereinafter referred to as a vehicle M) in which the vehicle system 1 is mounted is, for example, a two-wheeled vehicle, a three-wheeled vehicle, a four-wheeled vehicle, or the like. A driving source of the vehicle is an internal combustion engine such as a diesel engine or a gasoline engine, an electric motor, or a combination thereof. The electric motor is operated using electric power from an electric power generator connected to the internal combustion engine or discharge electric power of a secondary battery or a fuel cell.

In FIG. 1, for example, the vehicle system 1 includes a camera 10, a radar device 12, a finder 14, a physical object recognition device 16, a vehicle sensor 40, a navigation device 50, a driving operator 60, a human machine interface (HMI) 80, a driving assistance device 100, a travel driving force output device 200, a brake device 210, and a steering device 220. Such devices and equipment are connected to each other by a multiplex communication line such as a controller area network (CAN) communication line, a serial communication line, a wireless communication network, or the like. The configuration of the vehicle system 1 shown in FIG. 1 is merely an example, a part of the configuration may be omitted, and another configuration may be added. A combination of the navigation device 50, the HMI 80, and an HMI controller 150 is an example of an "information output device". The HMI 80 is an example of an "output". A combination of a navigation HMI 52, a head up display (HUD) 82, and a meter display 84 is an example of a "display".

The camera 10 images surroundings of the vehicle M and generates a captured image. For example, the camera 10 is a digital camera using a solid-state imaging element such as a charge coupled device (CCD) or a complementary metal oxide semiconductor (CMOS). The camera 10 is attached to any position on the vehicle (hereinafter, a vehicle M) in which the vehicle system 1 is mounted. The surroundings of the vehicle M includes front surroundings of the vehicle M and may include side or rear surroundings of the vehicle M. When the view in front of the vehicle M is imaged, the camera 10 is attached to an upper part of a front windshield, a rear surface of a rearview mirror, or the like. The camera 10 may be a stereo camera.

The radar device 12 radiates radio waves such as millimeter waves in a prescribed radiation direction near the vehicle M and detects at least a position (a distance to and a direction) of a physical object by detecting radio waves (reflected waves) reflected by the physical object. For example, the physical object is another vehicle, an obstacle, a structure, or the like located near the vehicle M. One or more radar devices 12 are attached to any positions on the vehicle M. The radar device 12 may detect a position and speed of the physical object according to a frequency modulated continuous wave (FM-CW) scheme.

The finder 14 is a light detection and ranging or laser imaging detection and ranging (LIDAR) finder in which scattered light from irradiation light is measured in a prescribed radiation direction near the vehicle M and a distance to a physical object is detected. One or more finders 14 are attached to any positions on the vehicle M.

The physical object recognition device 16 performs a sensor fusion process on detection results from some or all of the camera 10, the radar device 12, and the finder 14 to recognize a position, a type, a speed, and the like of a physical object located near the vehicle M. The physical object recognition device 16 may recognize a road shape around the vehicle M according to a sensor fusion process. Information of the recognized road shape may include, for example, information such as the number of road lanes and curvature. The physical object recognition device 16 outputs a recognition result to the driving assistance device 100.

For example, the vehicle sensor 40 includes a vehicle speed sensor configured to detect the speed of the vehicle M (which may be referred to as a vehicle speed hereinafter), an acceleration sensor configured to detect acceleration, a yaw rate sensor configured to detect an angular speed around a vertical axis, a direction sensor configured to detect a direction of the vehicle M, and the like.

For example, the navigation device 50 includes a global navigation satellite system (GNSS) receiver 51, a navigation HMI 52, and a route determiner 53. The navigation device 50 stores map information 54 in a storage device such as a hard disk drive (HDD) or a flash memory. The map information 54 is, for example, information in which a road shape is represented by a link indicating a road and nodes connected by a link. The map information 54 may include a link shape, traffic regulations, a type of road, a lane width, the number of lanes, a road structure, road curvature, sign information, point of interest (POI) information, and the like. The sign information includes, for example, a road name, road identification information, a speed limit, traffic regulations (one-way traffic, a go-straight lane, a right-turn lane, and parking prohibition), information about a destination of a road (for example, an area and a road), and the like. The map information 54 may include, for example, lane center information or lane boundary information and the like.

The GNSS receiver 51 identifies a position of the vehicle M on the basis of a signal received from a GNSS satellite. The navigation HMI 52 includes a display device, a speaker, a touch panel, keys, and the like. The navigation HMI 52 may be partly or wholly shared with the HMI 80 to be described below. For example, the route determiner 53 determines a route (for example, including information about visiting points when the vehicle M travels to a destination) from the position of the vehicle M identified by the GNSS receiver 51 (or any input position) to a destination input by an occupant (including a driver) using the navigation HMI 52 and a recommended lane based on a route to the destination with reference to the map information 54. For example, the route determiner 53 divides the route to the destination on the map into a plurality of blocks (for example, divides the route every 100 [m] with respect to a traveling direction of the vehicle), and determines a recommended lane for each block. For example, when the recommended lane is determined, the route determiner 53 determines in what lane numbered from the left the vehicle will travel. The route determiner 53 determines the recommended lane so that the vehicle M easily travels in a destination direction at a branch destination or a merging destination when there is a branch position or a merging position in the route on the map. The navigation device 50 provides route guidance using the navigation HMI 52 on the basis of a route or a recommended lane determined by the route determiner 53 at the time of an operation.

For example, the driving operator 60 is an operator for allowing a driver to control the steering and speed of the vehicle M according to manual driving. The driving operator 60 includes an accelerator pedal, a brake pedal, a shift lever, a steering wheel, and the like.

The HMI 80 presents various types of information to an occupant of the vehicle M and receives an operation input by the occupant. For example, the HMI 80 includes various types of display devices such as the HUD 82 and the meter display 84, a speaker 86, and a vibrator 88. The HMI 80 may include a light emitter, a buzzer, a microphone, various types of operation switches, keys, and the like. The HMI 80 includes, for example, an operator for switching the start or end of the operation of a travel controller 120 and the navigation device 50, an operator for selecting a display for displaying an image to be controlled by the HMI controller 150, and the like. Details of the HMI 80 will be described below.

The driving assistance device 100 includes, for example, the travel controller 120 and the HMI controller 150. When the HMI 80 has received an instruction for starting an operation of the travel controller 120, the travel controller 120 executes driving assistance control of the vehicle M on the basis of information obtained from the physical object recognition device 16, the vehicle sensor 40, or the like until an instruction for ending the operation of the travel controller 120 is received or until the vehicle M arrives at a destination. For example, when ACC is executed, the travel controller 120 controls the travel driving force output device 200 and the brake device 210 so that the vehicle M travels in a state in which an inter-vehicle distance is uniformly maintained between the vehicle M and a preceding traveling vehicle on the basis of information input from the camera 10, the radar device 12, and the finder 14 via the physical object recognition device 16. That is, the travel controller 120 performs acceleration and deceleration control (speed control) based on the inter-vehicle distance from the preceding traveling vehicle. Also, when LKAS is executed, the travel controller 120 controls the steering device 220 so that the vehicle M travels while maintaining a travel lane in which the vehicle M is currently traveling (lane keeping). That is, the driving assistance device 100 performs steering control for the lane keeping. When CMBS is executed, the travel controller 120 controls the travel driving force output device 200, the brake device 210, and the steering device 220 so that contact with an obstacle for which a distance from the vehicle M is short is avoided. That is, the driving assistance device 100 performs acceleration control and steering control for avoiding contact with a physical object.

The HMI controller 150 outputs information to the occupant by means of the HMI 80 and controls equipment mounted in the vehicle M on the basis of information received from the HMI 80. For example, the HMI controller 150 causes the HMI 80 to output information about a lane change in a prescribed output mode. The information about the lane change includes, for example, guidance information for guiding the occupant to make the lane change to the recommended lane associated with the route to the destination determined by the navigation device 50. The guidance information includes, for example, information indicating a start point of the lane change and a section in which the lane change is possible, information indicating a lane change destination and a destination direction, information indicating a timing for making the lane change, and the like. The HMI controller 150 causes the HMI 80 to output information about driving assistance to the driver in a prescribed output mode.

The information about the driving assistance includes, for example, information about a shape of a surrounding road, operation states of driving assistance functions (for example, ACC, LKAS, and CMBS) executed by the driving assistance device 100, information about a recommended lane, a road sign, and the like. Details of the functions of the HMI controller 150 will be described below.

The travel driving force output device 200 outputs a travel driving force (torque) for enabling the vehicle M to travel to drive wheels. For example, the travel driving force output device 200 includes a combination of an internal combustion engine, an electric motor, a transmission, and the like, and an electronic control unit (ECU) configured to control them. For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with information input from the driving operator 60 or information input from the travel controller 120 so that brake torque according to a braking operation is output to each wheel. For example, the steering device 220 includes a steering ECU and an electric motor. The steering ECU drives the electric motor and causes the direction of the steering wheels to be changed in accordance with the information input from the driving operator 60 or the information input from the travel controller 120.

HMI

Figure 2:
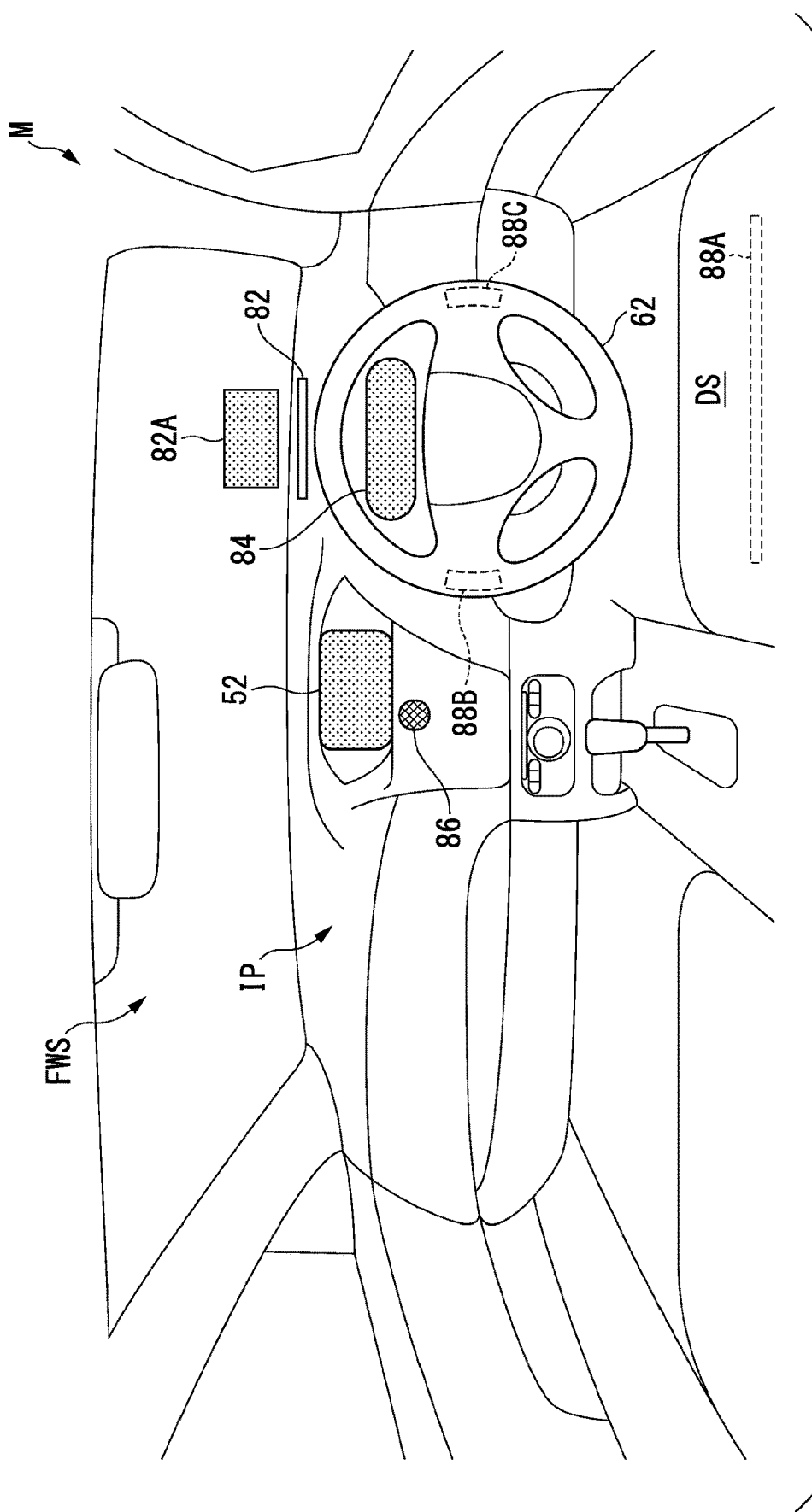
FIG. 2 is a diagram showing an example of a state of the interior of a vehicle M in which each part of an HMI is mounted.

Next, the HMI 80 will be described. FIG. 2 is a diagram showing an example of a state of the interior of the vehicle M in which each part of the HMI 80 is mounted. For example, the navigation HMI 52 is a display device such as a liquid crystal display (LCD) or an organic electro luminescence (EL) display disposed at the center of an instrument panel IP as shown in FIG. 2. The navigation HMI 52 includes, for example, a touch panel that receives an input operation by touching of the occupant's finger. The navigation HMI 52 displays a road shape around the vehicle M acquired from the map information 54 and a map and a route to the destination determined by the route determiner 53. The navigation HMI 52 may output information about driving assistance, information about a lane change, and the like in an output mode controlled by the HMI controller 150.

For example, as shown in FIG. 2, the HUD 82 is provided on or inside the instrument panel IP and allows the driver sitting in the driver's seat DS to visually recognize a virtual image by projecting light including an image onto a display area 82A of a part of a front windshield FWS in front of the driver's seat DS. The front windshield FWS is a member having optical transparency. The HUD 82 may be implemented by a display device having optical transparency (for example, a liquid crystal display or an organic EL) attached to the front windshield FWS, may project light onto a transparent member (such as a visor or a lens for spectacles) having a device worn by a human body, or may be an HUD to which a display device having optical transparency is attached.

For example, the HUD 82 designates an image obtained by imaging information about the above-described driving assistance and information about a lane change as a virtual image and allows the driver to visually recognize the image in a display mode controlled by the HMI controller 150. The HUD 82 allows the driver to visually recognize an image obtained by imaging a speed of the vehicle, a driving force distribution ratio, a rotation speed of an engine, an operation state of the driving assistance function, a shift position, and the like as a virtual image in a display mode controlled by the HMI controller 150. Hereinafter, a process in which the HMI controller 150 causes the HUD 82 to perform the above-described processing is referred to as a process of "causing the HUD 82 to display an image".

The meter display 84 is a display device which is provided, for example, in the vicinity of the front of the driver's seat DS in the instrument panel IP and is capable of being visually recognized by the driver from the gap of a steering wheel 62, which is an example of the driving operator 60, or through the steering wheel 62. For example, the meter display 84 is a display device such as an LCD or an organic EL display. For example, the meter display 84 displays instruments such as a speedometer and a tachometer. The meter display 84 may display the above-described information about driving assistance and the above-described information about a lane change in an output mode controlled by the HMI controller 150 in an area other than an area where instruments are displayed.

For example, the speaker 86 is provided in the instrument panel IP. The speaker 86 may be provided on a door, a ceiling, a seat, or the like. The speaker 86 outputs the information about the driving assistance and the information about the lane change to the interior of the vehicle by sound in an output mode controlled by the HMI controller 150.

The vibrator 88 is provided, for example, on the driver's seat DS, the steering wheel 62, the seat belt, and the like. In the example of FIG. 2, a vibrator 88A is provided within the driver's seat DS and vibrators 88B and 88C are provided on the left and right in the steering wheel 62. The vibrator 88 performs prescribed vibrations at a timing at which the information about the driving assistance and the information about the lane change described above are output in an output mode controlled by the HMI controller 150. The prescribed vibrations may be changed in accordance with, for example, a type of information about the driving assistance and a type of information about the lane change. The vibrations output by the vibrator 88 allow the driver to feel the vibrations of the driver's seat DS or the steering wheel 62 with his/her body or hand, so that it is possible to ascertain that driving assistance is being performed, a lane change is required, or the information about the driving assistance or the information about the lane change is output by the HUD 82 or by sound.

HMI Controller

Figure 3:
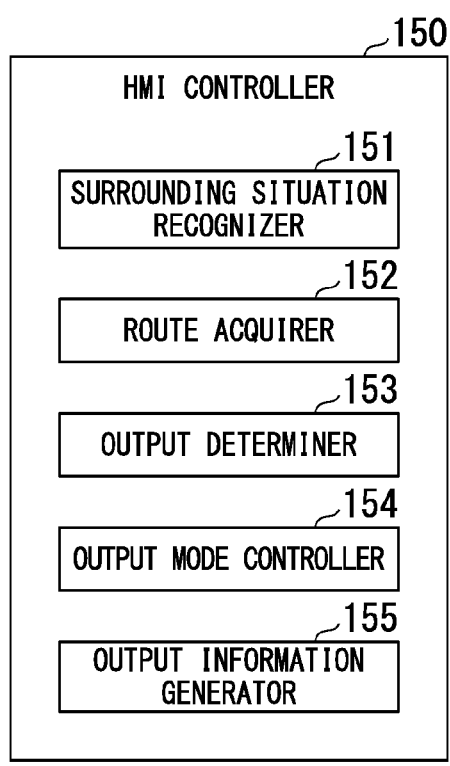
FIG. 3 is a functional configuration diagram of an HMI controller of the embodiment.

Next, a configuration example of the HMI controller 150 will be described. FIG. 3 is a functional configuration diagram of the HMI controller 150 of the embodiment. The HMI controller 150 includes, for example, a surrounding situation recognizer 151, a route acquirer 152, an output determiner 153, an output mode controller 154, and an output information generator 155. These components are implemented, for example, when a hardware processor such as a central processing unit (CPU) executes a program (software). Some or all of these components are implemented, for example, by hardware (a circuit including circuitry) such as large scale integration (LSI), an application specific integrated circuit (ASIC), a field-programmable gate array (FPGA), or a graphics processing unit (GPU) or may be implemented by cooperation between software and hardware. The above-described program may be pre-stored in a storage device such as an HDD or a flash memory provided in the HMI controller 150 (a storage device including a non-transitory storage medium) or pre-stored in a removable storage medium (a non-transitory storage medium) such as a DVD or a CD-ROM. The program may be installed in a storage device when the storage medium is mounted in a drive device. The surrounding situation recognizer 151 is an example of a "recognizer". A combination of the output determiner 153, the output mode controller 154, and the output information generator 155 is an example of an "output controller".

The surrounding situation recognizer 151 recognizes a surrounding situation of the vehicle M with reference to the map information 54 on the basis of position information of the vehicle M identified by the GNSS receiver 51. The surrounding situation includes, for example, a road shape and the number of lanes around the vehicle M, a travel lane of the vehicle M, sign information, and the like. The surrounding situation recognizer 151 may recognize the surrounding situation from information recognized by the physical object recognition device 16 instead of (or in addition to) acquisition from the map information 54. The surrounding situation recognizer 151 may recognize the surrounding situation by combining some or all of the plurality of recognition results described above.

The surrounding situation recognizer 151 may recognize a travel situation of the vehicle M on the basis of the recognized surrounding situation. For example, the surrounding situation recognizer 151 recognizes an orientation related to an extending direction of a travel road or a future travel road (for example, a road after merging or branching) on the basis of a road shape around the vehicle M included in the recognized surrounding situation, an orientation of the vehicle M detected by the vehicle sensor 40, and the like.

The route acquirer 152 acquires a route to a destination while the navigation device 50 is operating. The route acquirer 152 acquires information about a recommended lane associated with the route.

For example, the output determiner 153 determines whether or not it is necessary to cause the HMI 80 to output information about a lane change on the basis of the road shape around the vehicle M recognized by the surrounding situation recognizer 151 and a travel situation of the vehicle M. The output determiner 153 may determine, for example, whether or not it is necessary to cause the HMI 80 to output information about driving assistance on the basis of the road shape around the vehicle M and the travel situation of the vehicle M.

The output mode controller 154 controls an output mode for notifying the driver of the information about the lane change when the output determiner 153 determines that it is necessary to output the information about the lane change. The output mode includes, for example, one or more types of target equipment that output information in the HMI 80, a timing at which information is output, a section in which an output is continued, output details, and the like. The output mode controller 154 may control the output mode for notifying the driver of the information about the driving assistance when the output determiner 153 determines that it is necessary to output the information about the driving assistance.

The output information generator 155 generates information to be output to the occupant in an output mode set by the output mode controller 154 on the basis of the information obtained by the route acquirer 152 and outputs the generated information from the target equipment. Specifically, the output information generator 155 generates information about the lane change to be output to the occupant in an output mode set by the output mode controller 154 and outputs the generated information from the target equipment. For example, when the information about the lane change is displayed on a display such as the HUD 82, the output information generator 155 generates an image corresponding to the information about the lane change and causes a target display to display the generated image. The generated image may include an animation image. The output information generator 155 generates a sound corresponding to the information about the lane change when the speaker 86 outputs the sound and causes the speaker 86 to output the generated sound. The generated sound includes, for example, a sound for a notification of a timing at which the lane change is made, a sound indicating a lane change direction, and the like. When the vibrator 88 outputs prescribed vibrations, the output information generator 155 generates vibration information corresponding to the information about the lane change and causes the vibrator 88 to generate vibrations on the basis of the generated vibration information.

The output information generator 155 generates information to be output to the occupant on the basis of an output mode set by the output mode controller 154 when the output determiner 153 determines that it is necessary to output the information about the driving assistance. For example, when the occupant is notified of the information about the driving assistance by sound, the generated sound includes an operating state of the driving assistance function, sign information about the travel lane, and the like.

Control Pattern of HMI Controller

Next, details of the functions of the HMI controller 150 will be described. Hereinafter, determination details in the output determiner 153 and details of the output control in the output mode controller 154 based on the determination details are mainly divided into several patterns for description. Hereinafter, a control pattern for causing the HMI 80 to output guidance information for guiding the driver to make a lane change will be described.

First Control Pattern

Figure 4:
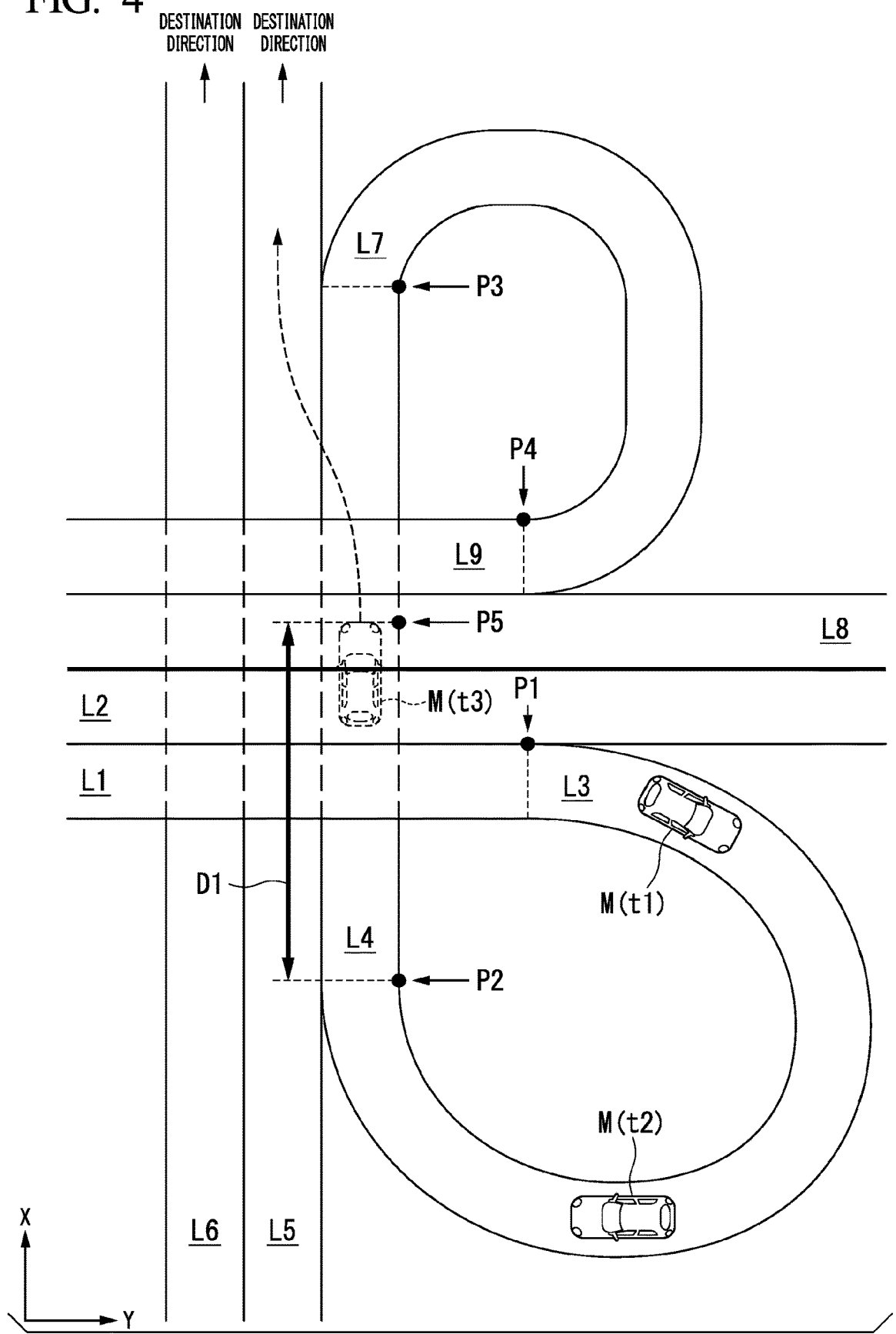
FIG. 4 is an explanatory diagram showing a first control pattern of output control.

FIG. 4 is an explanatory diagram showing a first control pattern of output control. In the example of FIG. 4, lanes L1 to L9 are shown. For example, the lanes L1 to L9 are identified by links and nodes included in the map information 54. The lanes L4 to L6 are lanes extended in an X-axis direction shown in FIG. 2 and are examples of lanes of a "first road". The lanes L1, L2, L8, and L9 are lanes extended in a Y-axis direction shown in FIG. 4 and are examples of lanes of a "second road". The second road is a road that three-dimensionally intersects the first road. The three-dimensional intersection is, for example an intersection at which the first road and the second road pass through different planes and intersect at different heights. In the example of FIG. 4, the second road intersects at a position above the first road. The lanes L1 and L2 and the lanes L8 and L9 of the second road are opposite lanes.

In the example of FIG. 4, the lanes L3 and L7 are lanes for connecting the first road and the second road. Specifically, the lane L3 is connected to the lane L1 at a point P1 and connected to the lane L4 at a point P2. The point may be, for example, a position represented by one point or a position represented by a straight line drawn in a lane width direction on the basis of the lane. The same applies to the following description of respective points. The lane L7 is connected to the lane L4 at a point P3 and connected to the lane L9 at a point P4. Some or all of the lanes L3 and L7 include curved roads having the same prescribed curvature or different prescribed curvatures. The prescribed curvature is, for example, curvature at which a curvature radius of the curved road is less than or equal to a threshold value. The lane L3 is an example of a "merging lane" that merges with the first road and the point P2 is an example of a "merging point". The lane L7 is an example of a "branch lane" that branches from the first road and the point P3 is an example of a "branch point". In the following description, a relationship of "t1<t2<t3" for times t1 to t3 is assumed to be established and vehicle positions at the respective times are represented by vehicles M(t1) to M(t3). In the following description, the lanes of the vehicle M traveling in the destination direction are assumed to be the lanes L5 and L6.

In the first control pattern, the output determiner 153 determines whether or not the travel lane of the vehicle M is the merging lane L3 which merges with the first road and a distance D1 to a point where a lane change is required after merging with the first road is less than or equal to a first prescribed distance Dth1. The output mode controller 154 causes the HMI 80 to output guidance information generated by the output information generator 155 in a prescribed output mode on the basis of a determination result from the output determiner 153.

Figure 5:
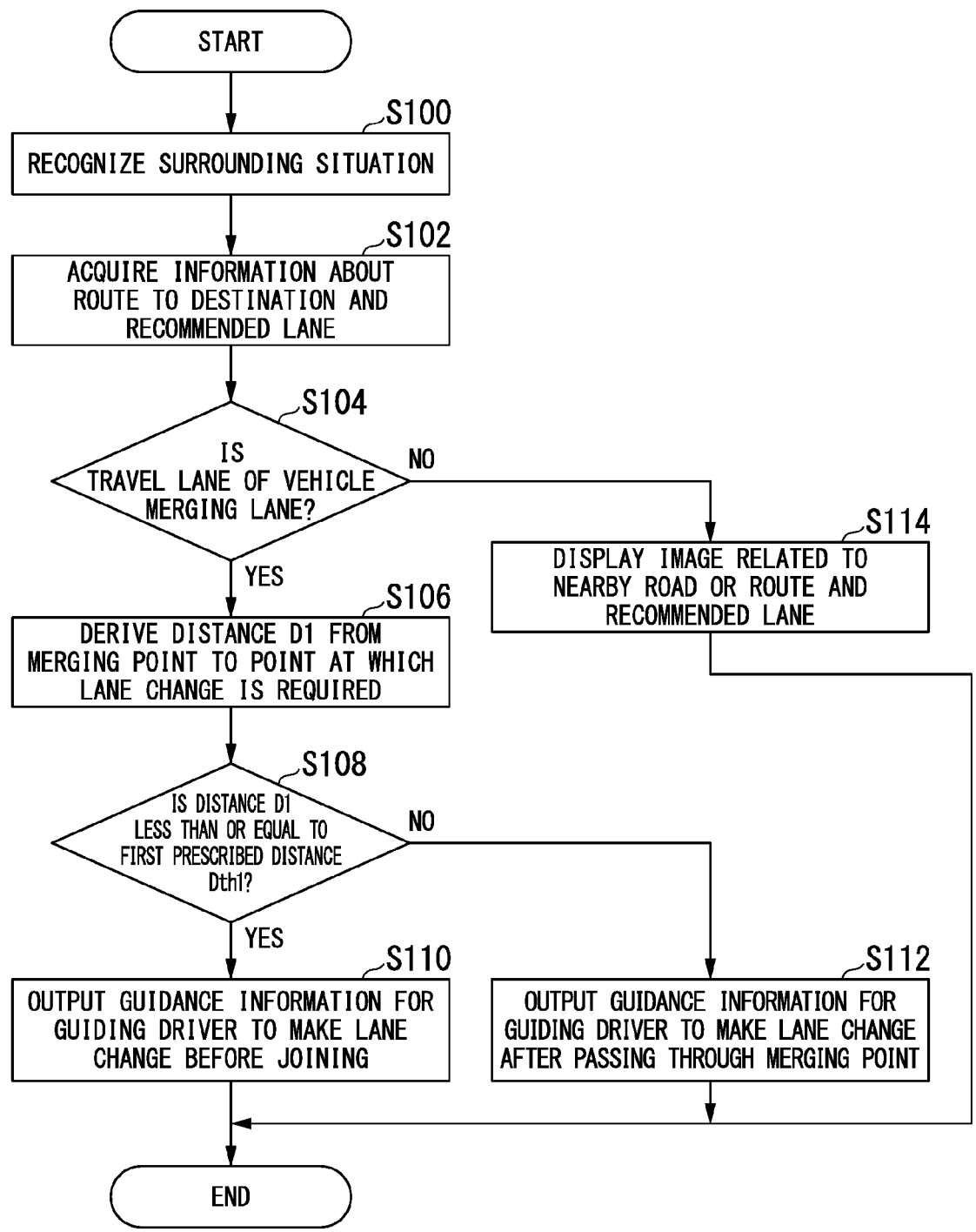
FIG. 5 is a flowchart showing an example of a flow of a process of the HMI controller in a first control pattern.

FIG. 5 is a flowchart showing an example of a flow of a process of the HMI controller 150 in the first control pattern. The process shown in FIG. 5 may be iteratively executed at prescribed timings or using a prescribed cycle. For example, the process shown in FIG. 5 is iteratively executed until the vehicle M arrives at a destination set by the navigation device 50.

In the example of FIG. 5, the surrounding situation recognizer 151 first recognizes a surrounding situation of the vehicle M (step S100). Next, the route acquirer 152 acquires information about a route to a destination and a recommended lane determined by the navigation device 50 (step S102). Next, the output determiner 153 determines whether or not a travel lane of the vehicle M is the merging lane L3 on the basis of position information of the vehicle M and map information 54 obtained from the navigation device 50 (step S104). Specifically, the output determiner 153 refers to the map information 54 on the basis of the position information of the vehicle M and determines whether or not the travel lane of the vehicle M is the merging lane L3 on the basis of a road shape of a road corresponding to a position of the vehicle M and a traveling direction based on the route to the destination.

When it is determined that the travel lane of the vehicle M is the merging lane L3, the output determiner 153 derives a distance from the merging point P2 to a point where a lane change is required (step S106). The point where the lane change is required is, for example, a point where the recommended lane acquired from the navigation device 50 is switched or a point at a prescribed distance before the branch point P3 and is a point at which it is estimated that the driver can make a lane change with a margin. In the example of FIG. 4, a point P5 is assumed to be a point where the lane change is required. In this case, the output determiner 153 refers to the map information 54 and the like and derives the distance D1 from the point P2 to the point P5.

Next, the output determiner 153 determines whether or not the derived distance D1 is less than or equal to the first prescribed distance Dth1 (step S108). When it is determined that the distance D1 is less than or equal to the first prescribed distance Dth1, the output mode controller 154 causes the output information generator 155 to generate guidance information for guiding the driver to make the lane change from the lane L4 to the lane L5, and causes the HMI 80 to output the generated information, before the vehicle M joins the first road (step S110). The time before the vehicle M joins the first road is, for example, a timing when the vehicle M has arrived at a prescribed point before the merging point P2. The prescribed point is, for example, a point where an orientation of the vehicle M which is traveling in the merging lane L3 becomes a prescribed orientation with respect to the extending direction of the first road.

Figure 6:
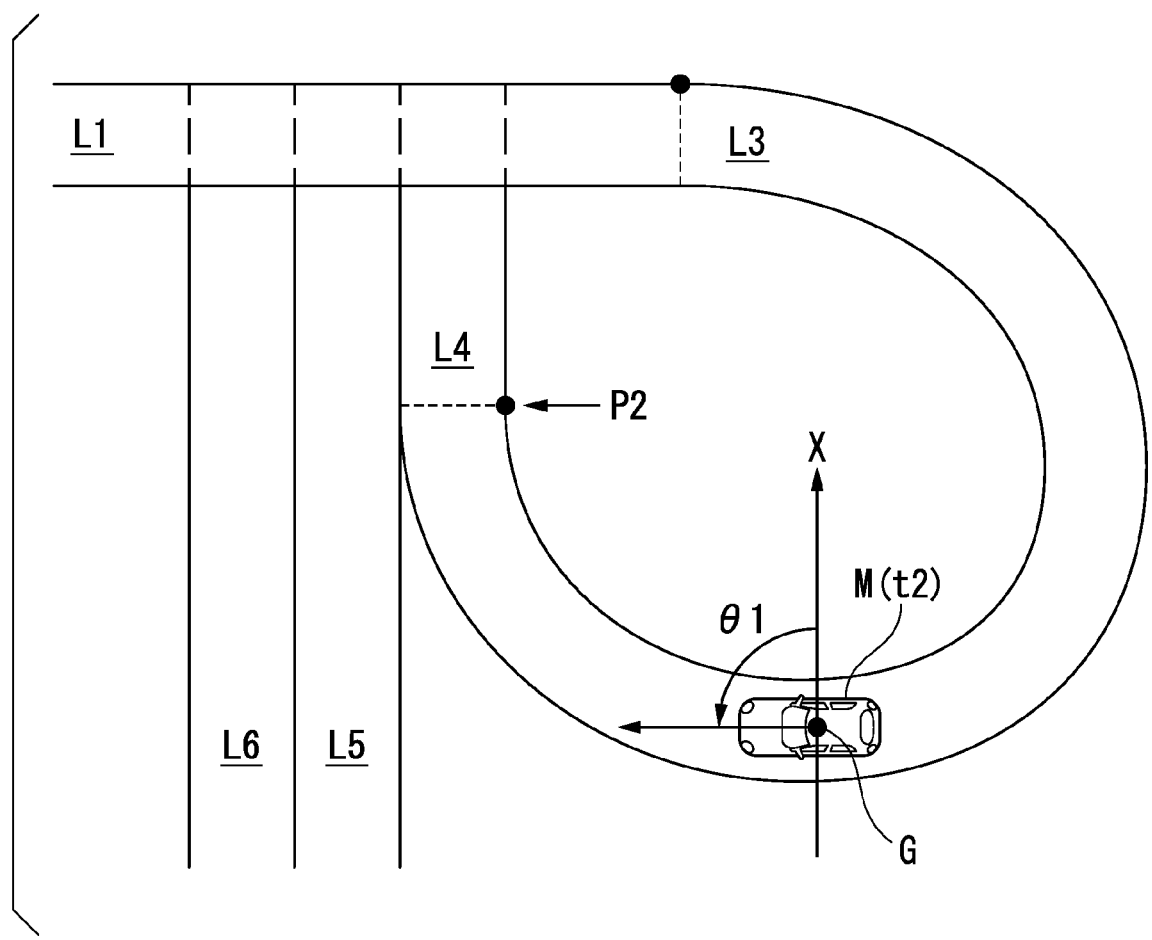
FIG. 6 is an explanatory diagram showing an orientation of the vehicle M in an extending direction of a first road.

FIG. 6 is an explanatory diagram showing the orientation of the vehicle M with respect to the extending direction of the first road. FIG. 6 is an enlarged view of the surroundings of the vehicle M(t2) at time t2 shown in FIG. 4. The output mode controller 154 derives an angle θ1 of the forward direction of the vehicle M with respect to a traveling direction (the X-axis direction shown in FIG. 6) of the lane L4 of a merging destination in a direction in which the first road is extended on the basis of a road shape of the first road (the lanes L4 to L6) obtained from the map information 54 and an orientation of the vehicle M obtained by the vehicle sensor 40 (for example, an orientation based on the center (or the center of gravity) G of the vehicle M). Then, the output mode controller 154 causes the HMI 80 to output guidance information about the lane change when the angle θ1 is less than or equal to a prescribed angle θth.

The prescribed angle θth is, for example, an angle at which it is estimated that the driver who is driving the vehicle M which is traveling in the merging lane (the lane L3) will be able to visually recognize the merging point P2 associated with the first road and or visually recognize the traveling direction of the road after joining the road. Specifically, for example, the prescribed angle θth is less than an angle (about 90 [degrees]) at which the forward direction of the vehicle M is substantially perpendicular to a direction in which the first road is extended. Therefore, in the example of FIG. 4, even when the vehicle M travels in the merging lane, no guidance information is output at a position of the vehicle M(t1) and guidance information is output at a position of the vehicle M(t2) where the angle θ1 is less than or equal to the prescribed angle θth. For example, the output mode controller 154 may variably set the prescribed angle θth on the basis of a shape and curvature of the merging lane L3. Thus, by outputting guidance information at a timing at which the driver can visually recognize the road after joining, it is possible for the driver to predict a position where the lane change will be made and cause the lane change to be made with a margin at a more appropriate timing. Although the driver is likely to misunderstand that there is a lane change while he/she reaches the point P2 from the point P1 when the vehicle M outputs guidance information for the lane change immediately after passing through the point P1, it is possible to minimize the above-mentioned misunderstanding by outputting the guidance information according to the output mode in the present embodiment.

The prescribed point before the vehicle M joins the first road may be, for example, a point a prescribed distance before the merging point P2. In this case, for example, the output mode controller 154 may set the prescribed distance as a fixed value or may variably set the prescribed distance on the basis of a shape and curvature of the merging lane L3.

When the vehicle M travels in the merging lane L3 including a curved road with prescribed curvature at least partially or entirely, the driver needs to travel while checking the surroundings. Thus, when guidance information is output while the vehicle M is traveling in the merging lane L3, the output mode controller 154 causes a sound to be output by means of the speaker 86 or causes the vibrator 88 to generate vibrations. Thereby, the driver can ascertain the guidance information more safely while monitoring the view in front of the vehicle M and the like without moving his/her line of sight to the display or the like.

When the guidance information is output by sound while the vehicle M is traveling in the merging lane, the output mode controller 154 causes the output information generator 155 to generate a sound such as "Please make a lane change to a left lane after joining" so that the lane change after joining is clearly made and causes the speaker 86 to output the generated sound. Thereby, the driver can easily ascertain that the lane change will be made on a road that he/she has joined.

Returning to FIG. 5, when it is determined that the distance D1 is not less than or equal to the first prescribed distance Dth1 in the processing of step S108, the output mode controller 154 causes the output information generator 155 to generate guidance information about the lane change and causes the HMI 80 to output the generated information at a prescribed timing after the vehicle M passes through the merging point P2 (step S112). In this case, the prescribed timing is, for example, a timing at which the vehicle M has arrived at a point a prescribed distance before the point P5 where the lane change is required. When the guidance information is output in the processing of step S112, because the vehicle M is traveling in the straight-line lane L4, a degree to which the surroundings of the driver are monitored is less than that when the vehicle M is traveling on a curved road. Thus, the output mode controller 154 may cause the output information generator 155 to generate an image including guidance information instead of (or in addition to) a sound and vibrations, and cause a display such as the meter display 84 to display the generated image.

When it is determined that the travel lane of the vehicle M is not the merging lane L3 in the processing of step S104, the output information generator 155 generates an image related to a nearby road or a route to a destination and a recommended lane and the generated image is displayed on the display of the HMI 80 (step S114). Thereby, the process of the present flowchart ends.

According to the above-described first control pattern, when the distance D1 from the merging point P2 to the point P5 where the lane change is required is short, i.e., when the time for which the lane change is possible is short after joining, a timing at which the guidance information about the lane change is output can be advanced. Therefore, the driver can early ascertain before joining that the lane change after joining will be made and can make the lane change from the lane L4 to the lane L5 at a point in time when the vehicle M has arrived at the point P3 (a position of the vehicle M(t3)) with a margin.

Second Control Pattern

Figure 7:
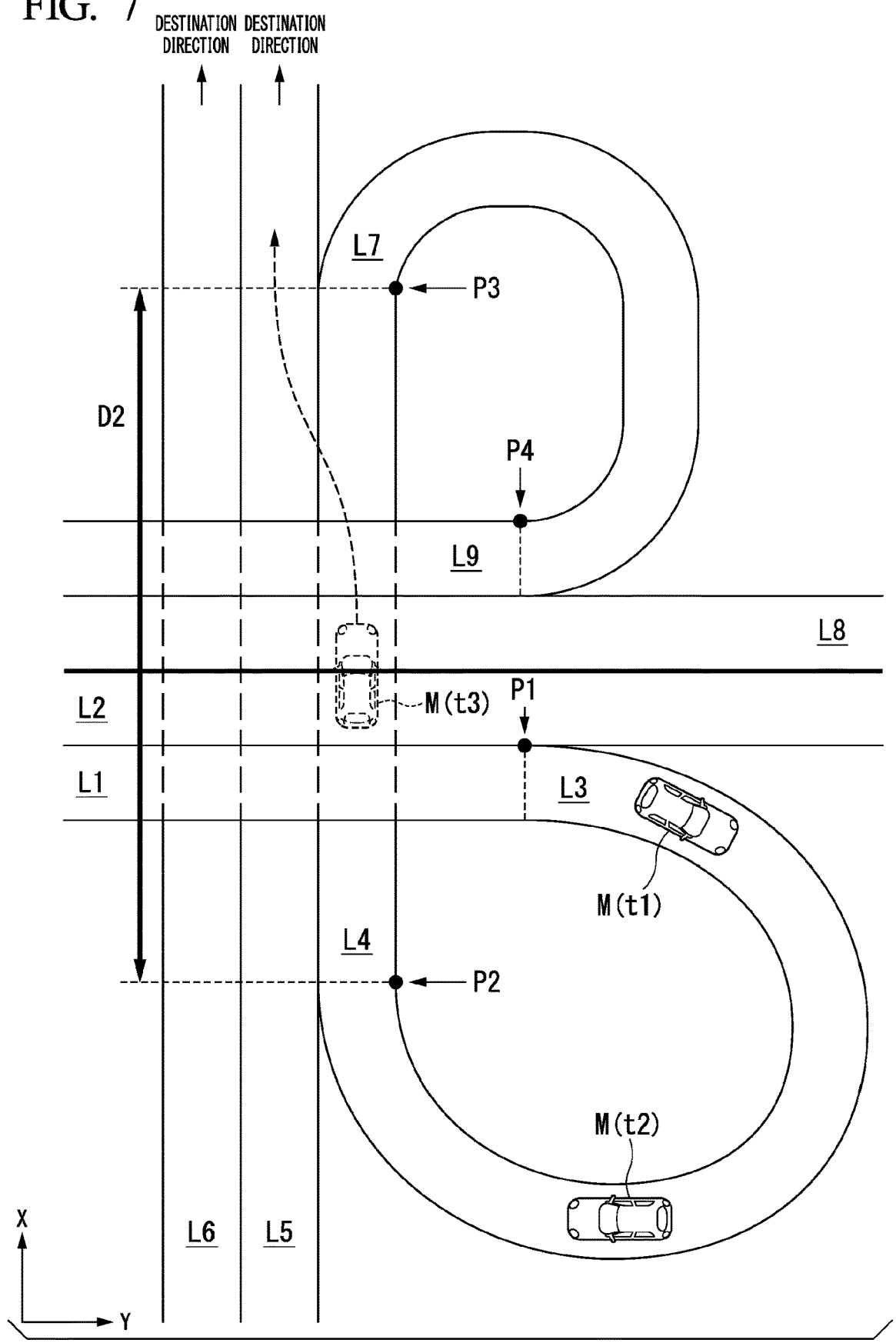
FIG. 7 is an explanatory diagram showing a second control pattern of output control.

Next, a second control pattern of output control will be described. FIG. 7 is an explanatory diagram showing the second control pattern of output control. Because the road shape shown in FIG. 7 is similar to the road shape shown in FIG. 4, specific description thereof will be omitted here. The same applies to control patterns to be described below.

In the second control pattern, the output determiner 153 determines whether or not a distance D2 from a merging point P2 to a branch point P3 is less than or equal to a second prescribed distance Dth2 when a lane L4 of a first road merging with a merging lane L3 is connected to a branch lane L7 that branches from the first road again. The output mode controller 154 causes the HMI 80 to output guidance information in a prescribed output mode on the basis of a determination result from the output determiner 153.

Figure 8:
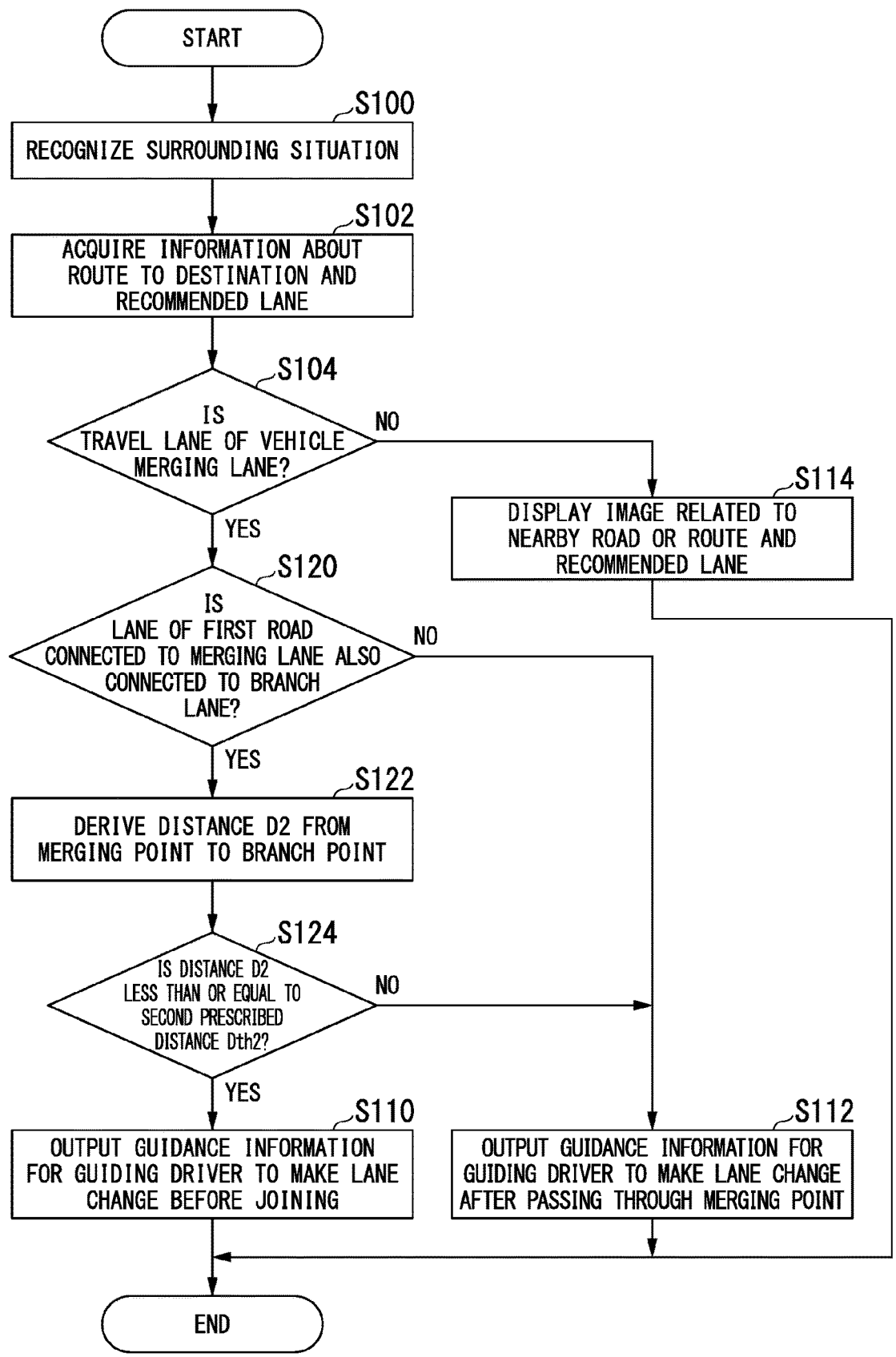
FIG. 8 is a flowchart showing an example of a flow of a process of the HMI controller in the second control pattern.

FIG. 8 is a flowchart showing an example of a flow of a process of the HMI controller 150 in the second control pattern. The processing shown in FIG. 8 is different from the processing of steps S100 to S114 shown in FIG. 5 described above in that the processing of steps S120 to S124 is provided instead of the processing of steps S106 and S108. Therefore, the processing of steps S120 to S124 will be mainly described below and description of the other processing will be omitted.

In the processing of step S104 in FIG. 8, when the travel lane of the vehicle M is the merging lane L3, the output determiner 153 determines whether or not the lane L4 of the first road connected to the merging lane L3 is also connected to the branch lane L7 (step S120). When it is determined that the lane L4 connected to the merging lane L3 is also connected to the branch lane L7, the output determiner 153 derives the distance D2 from the merging point P2 to the branch point P3 (step S122). In this case, the output determiner 153 refers to the map information 54 and the like and derives the distance D2 from the point P2 to the point P3. The output determiner 153 may calculate the distance D2 from an image including the points P2 and P3 captured by the camera 10.

Next, the output determiner 153 determines whether or not the distance D2 is less than or equal to the second prescribed distance Dth2 (step S124). When it is determined that the distance D2 is less than or equal to the second prescribed distance Dth2, the output mode controller 154 causes the output information generator 155 to generate guidance information for guiding the driver to make a lane change from the lane L4 to the lane L5, and causes the HMI 80 to output the generated information, at a prescribed point before the vehicle M joins the first road (step S110). When it is determined that the distance D2 is not less than or equal to the second prescribed distance Dth2 in the processing of step S124, the output mode controller 154 causes the output information generator 155 to generate the above-described guidance information, and causes the HMI 80 to output the generated information, at a prescribed timing after the vehicle M passes through the merging point P2 (step S112). When the lane of the first road connected to the merging lane is not connected to the branch lane in the processing of step S120, the output mode controller 154 performs the above-described processing of step S112.

According to the above-described second control pattern, when the distance from the merging point P2 to the branch point P3 is short, a timing at which guidance information about the lane change is output is advanced, so that the driver can ascertain that the lane change will be made before joining and can make the lane change from the lane L4 to the lane L5 with a margin. According to the second control pattern, it is possible to cause the guidance information about the lane change to be output at a more appropriate timing on the basis of a shape of a road on which the vehicle will travel in the future.

Third Control Pattern

Figure 9:
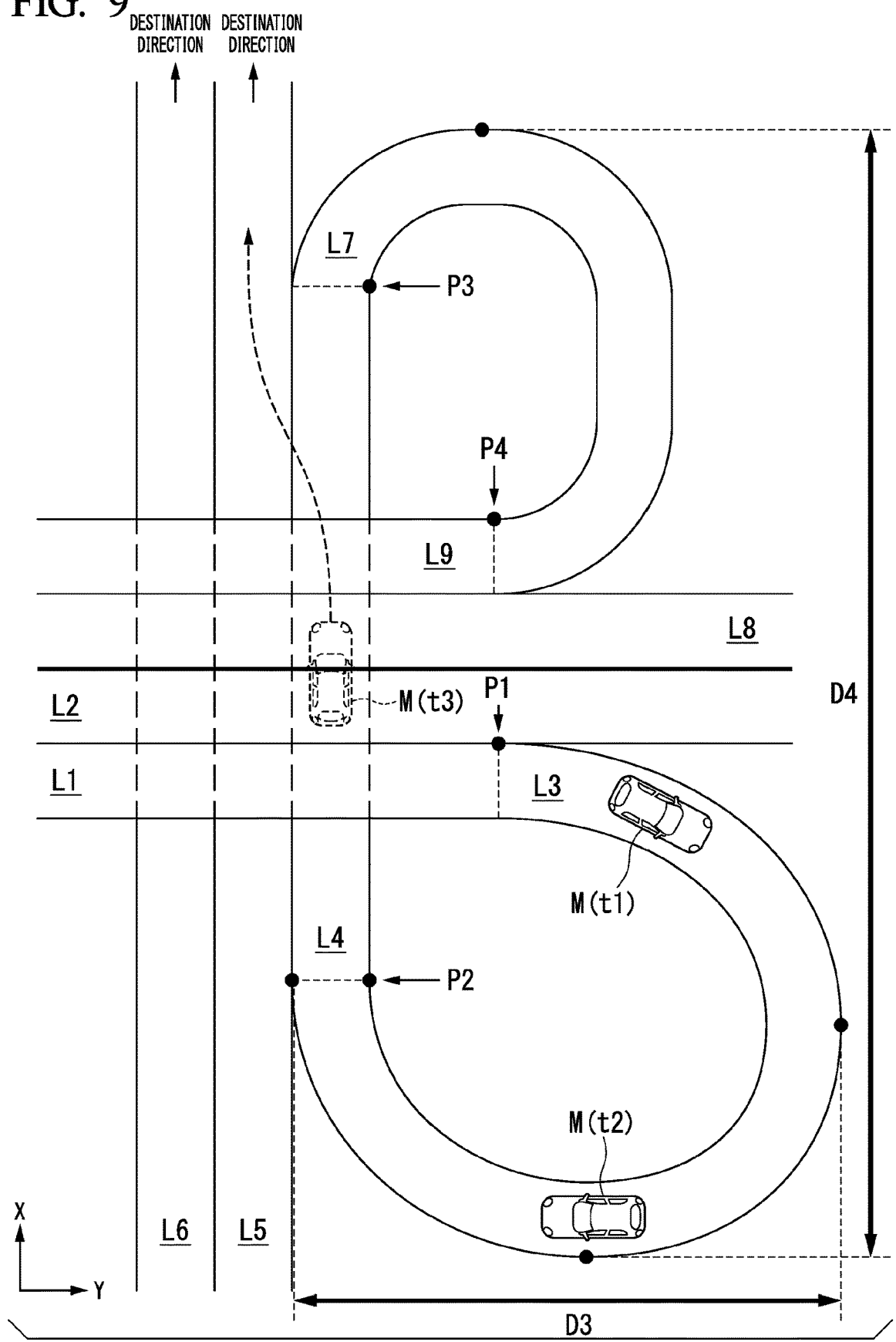
FIG. 9 is an explanatory diagram showing a third control pattern of output control.

Next, a third control pattern of output control will be described. FIG. 9 is an explanatory diagram showing the third control pattern of output control. In the third control pattern, the output determiner 153 derives a distance D3 in a direction in which a second road of a merging lane L3 is extended and a distance D4 in a direction in which a first road is extended in a road shape in which the merging lane L3 and a branch lane L7 are combined when the merging lane L3 is connected to the first road and the second road in a road shape including a curved road with prescribed curvature and the lane of the first road connecting the merging lane L3 is connected to the branch lane L7. Then, the output determiner 153 determines whether or not the derived distance D3 is greater than the distance D4. The output mode controller 154 causes the HMI 80 to output guidance information in a prescribed output mode on the basis of a determination result from the output determiner 153.

Figure 10:
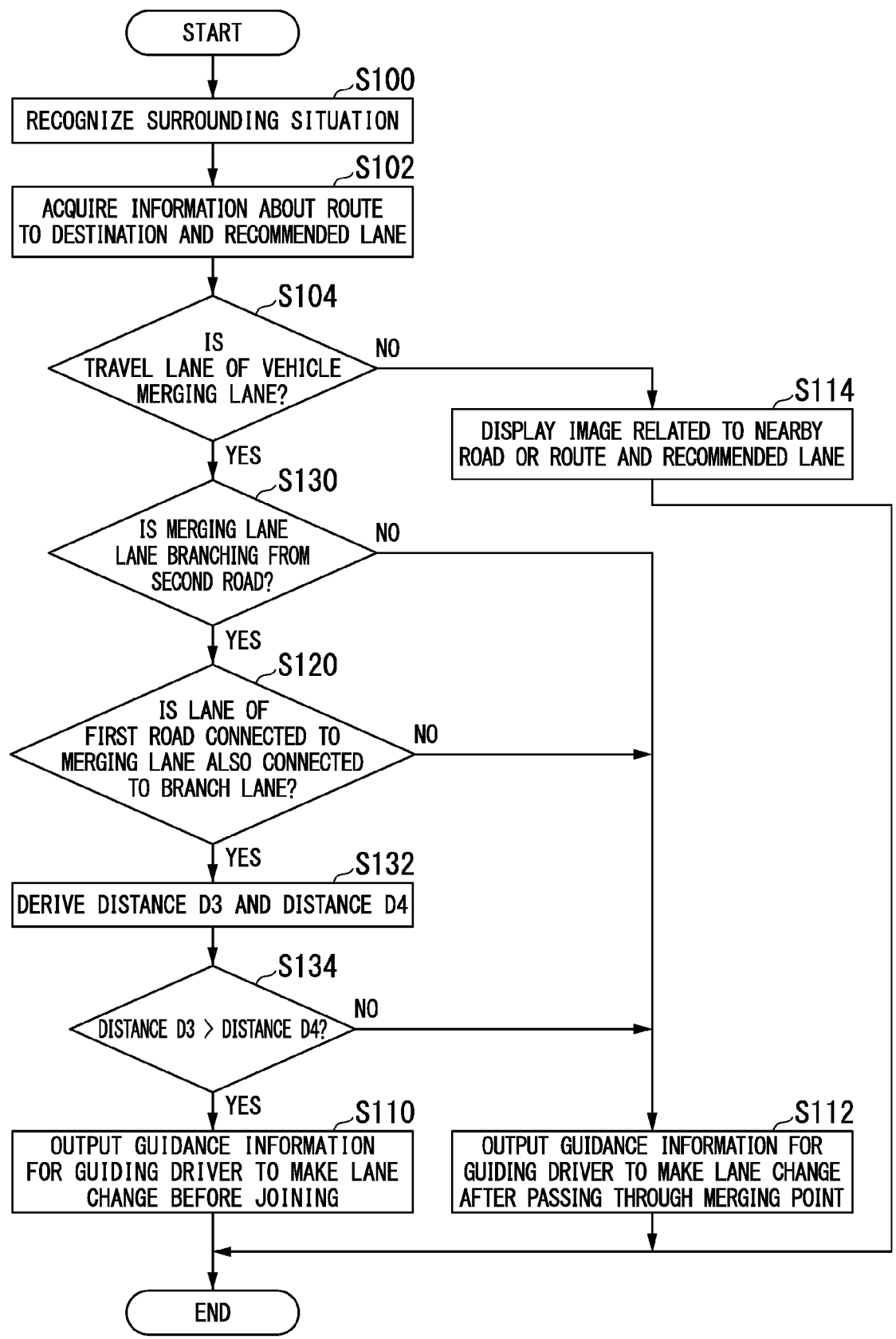
FIG. 10 is a flowchart showing an example of a flow of a process of the HMI controller in a third control pattern.

FIG. 10 is a flowchart showing an example of a flow of a process of the HMI controller 150 in the third control pattern. The process shown in FIG. 10 is different from the process of the second control pattern shown in FIG. 8 described above in that the processing of steps S130 to S134 is provided instead of the processing of steps S122 and S124. Therefore, the processing of steps S130 to S134 will be mainly described below and description of the other processing will be omitted.

When a travel lane of the vehicle M is the merging lane L3 in the processing of step S104 of FIG. 10, the output determiner 153 determines whether or not the merging lane L3 is a lane including a curved road with prescribed curvature branching from the second road (step S130). In the example of FIG. 9, the merging lane L3 is assumed to be a lane that is connected to the lane L1 of the second road and branches from the lanes L2, L8, and the like of the second road and that has prescribed curvature. Therefore, in the example of FIG. 9, the merging lane L3 satisfies the above-described condition. When it is determined that the merging lane L3 is a lane that includes a curved road with prescribed curvature branching from the second road, the output determiner 153 determines whether or not a lane L4 of the first road connected to the merging lane L3 is also connected to the branch lane L7 (step S120).

When it is determined that the lane L4 of the first road connected to the merging lane L3 is also connected to the branch lane L7, the output determiner 153 derives the distance D3 and the distance D4 described above (step S132). Specifically, the output determiner 153 acquires a road shape and position information (coordinate information) of the merging lane L3 with reference to map information 54 and derives the distance D3 in a direction in which the second road is extended (a Y-axis direction in the example of FIG. 9) on the basis of an area of a road shape of the merging lane L3 obtained from the acquired information. Also, the output determiner 153 refers to the map information 54, acquires road shapes and position information (coordinate information) of the merging lane L3 and the branch lane L7 and derives the distance D4 in a direction in which the first road is extended (an X-axis direction in the example of FIG. 9) on the basis of an area of a road shape in which the merging lane L3 and the branch lane L7 obtained from the acquired information are combined.

Next, the output determiner 153 determines whether or not the above-described distance D3 is greater than the distance D4 (step S134). When it is determined that the distance D3 is greater than the distance D4, the output mode controller 154 causes the output information generator 155 to generate guidance information for guiding the driver to make a lane change from the lane L4 to a lane L5, and causes the HMI 80 to output the generated information, at a prescribed point before the vehicle M joins the first road (step S110). When it is determined that the distance D3 is less than or equal to the distance D4 in the processing of step S132, the output mode controller 154 causes the output information generator 155 to generate the above-described guidance information, and causes the HMI 80 to output the generated information, at a prescribed timing after the vehicle M passes through the merging point P2 (step S112).

When the merging lane L3 is not a branch lane branching from the second road in the processing of step S130, the output mode controller 154 executes the above-described processing of step S112.

According to the above-described third control pattern, when the distance D3 is greater than the distance D4, the driver can ascertain that the lane change will be made before joining and make the lane change from the lane L4 to the lane L5 with a margin by estimating that a section of the lane L4 is short and advancing a timing at which information about the lane change is output. According to the third control pattern, it is possible to cause the information about the lane change to be output at a more appropriate timing on the basis of road shapes of the merging lane and the branch lane.

In the third control pattern, the output determiner 153 may perform a process of determining whether or not the branch lane L7 is a lane connected to the second road again and having prescribed curvature between the processing of step S120 and the processing of step S132 in addition to the above-described process. The output determiner 153 performs the processing from step S132 when the branch lane L7 is a lane with prescribed curvature connected to the second road and performs the processing of step S112 when the above-described condition is not satisfied. Thereby, it is possible to cause the HMI 80 to output information about the lane change at a more appropriate timing on the basis of road shapes of lanes (the merging lanes L3 and L7) connecting the first road and the second road that three-dimensionally intersect.

Fourth Control Pattern

Figure 11:
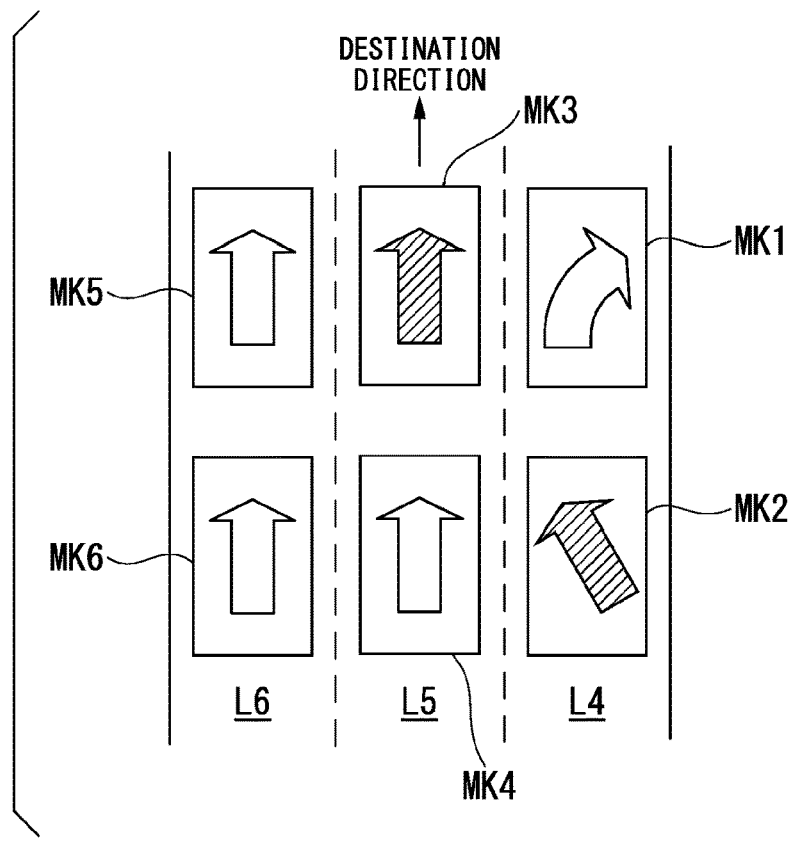
FIG. 11 is an explanatory diagram showing a fourth control pattern of output control.

Next, a fourth control pattern of output control will be described. FIG. 11 is an explanatory example of the fourth control pattern of output control. In FIG. 11, an example of an image displayed on the HUD 82 or the meter display 84 immediately after the vehicle passes through a merging point P2 and while the vehicle is traveling in a lane L4 is shown. In the example of FIG. 11, an image schematically showing lanes L4 to L6 and mark images MK1 to MK6 indicating traveling directions of lanes are shown. More specifically, in the example of FIG. 11, the mark images MK1 and MK2 are displayed on an image of the lane L4, the mark images MK3 and MK4 are displayed on an image of the lane L5, and the mark images MK5 and MK6 are displayed on an image of the lane L6.

For example, when there is another branch immediately after the vehicle M joins the lane L4 from the merging point P2 (for example, when the lane L5 and the lane L6 branch and only the lane L5 is directed in a destination direction of the vehicle M), there is a possibility that the vehicle M will not move in the destination direction if the vehicle M makes the lane change to the lane L6. Therefore, the output mode controller 154 simultaneously displays the mark image MK3 of a lane in which the vehicle M is required to travel together with the mark image MK2 of lane change guidance as shown in FIG. 11 when there is another branch within a prescribed distance after joining. More specifically, the output mode controller 154 causes the mark images MK2 and MK3 in which the vehicle M is required to travel to be distinguishably displayed in a display mode different from those of other mark images. Accordingly, it is possible to allow the driver to make the lane change from the lane L4 to the lane L5 and minimize the lane change from the lane L5 to the lane L6 and prevent the driver from being unable to go in a destination direction.

According to the above-described embodiment, it is possible to output the guidance information about the lane change at a more appropriate timing Thereby, the driver can drive the vehicle with a margin on the basis of guidance information without being confused. Each of the first to fourth control patterns described above may be combined with some or all of the other control patterns.

Hardware Configuration

Figure 12:
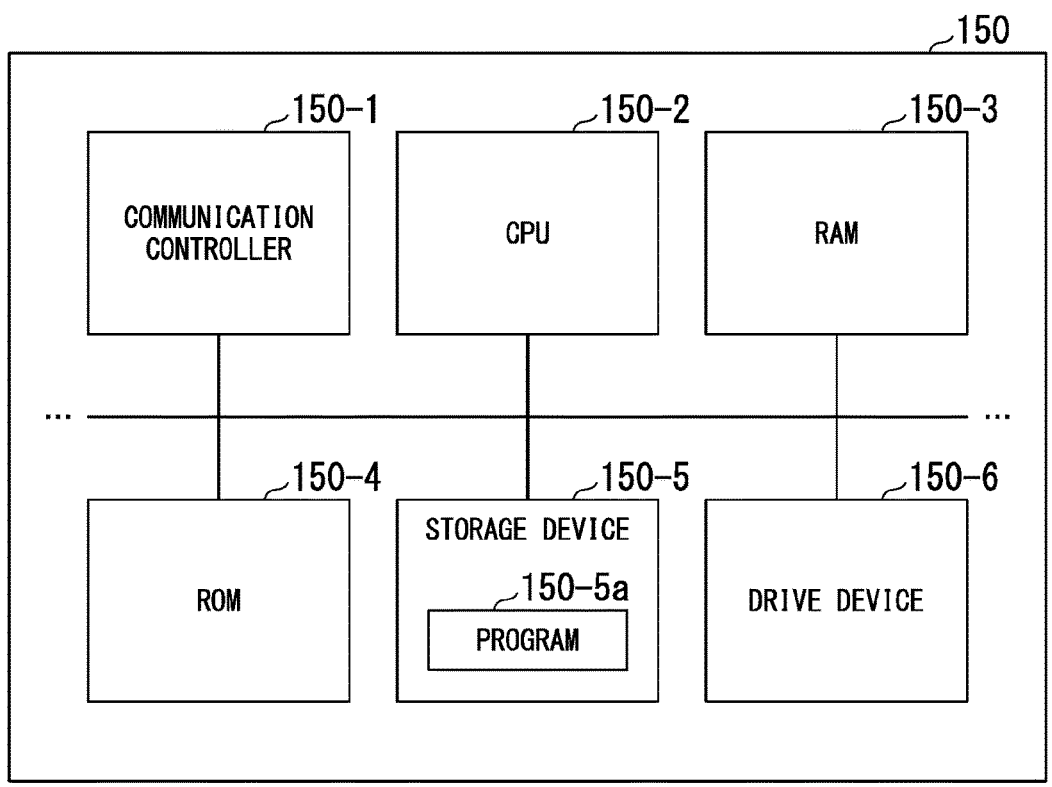
FIG. 12 is a diagram showing an example of a hardware configuration of the HMI controller of the embodiment.

For example, the HMI controller 150 of the information output device of the above-described embodiment is implemented by a hardware configuration as shown in FIG. 12. FIG. 12 is a diagram showing an example of a hardware configuration of the HMI controller 150 of the embodiment.

The HMI controller 150 has a configuration in which a communication controller 150-1, a CPU 150-2, a random access memory (RAM) 150-3, a read only memory (ROM) 150-4, a storage device 150-5 such as a flash memory or a hard disk drive (HDD), a drive device 150-6, and the like are mutually connected by an internal bus or a dedicated communication line. A portable storage medium such as an optical disk is attached to the drive device 150-6. A program 150-5a stored in the storage device 150-5 is loaded to the RAM 150-3 by a direct memory access (DMA) controller (not shown) or the like and executed by the CPU 150-2, so that functions of the components of the HMI controller 150 are implemented. A program referred to by the CPU 150-2 may be stored in the portable storage medium attached to the drive device 150-6 or may be downloaded from another device via a network NW.

The above-described embodiment can be implemented as follows.

An information output device including:
a storage device; and
a hardware processor configured to execute a program stored in the storage device,
wherein the hardware process executes the program to acquire a route to a destination of a vehicle;
cause an output to output guidance information for guiding an occupant to make a lane change to a recommended lane associated with the acquired route to the destination; and
cause, when a travel lane of the vehicle is a merging lane that merges with a first road and a distance from a point at which the travel lane merges with the first road to a point at which the lane change is required is less than or equal to a first prescribed distance, the output to output the guidance information before the vehicle joins the first road.

Although modes for carrying out the present invention have been described using embodiments, the present invention is not limited to the embodiments, and various modifications and substitutions can also be made without departing from the scope and spirit of the present invention.

What is claimed is:
1. An information output device comprising:
a processor that executes instructions to:
acquire a route to a destination of a vehicle and a recommended lane associated with the route to the destination based on the position information of the vehicle and map information determined by a navigation device;
cause the output to output a guidance information for guiding an occupant to make a lane change from a travel lane of the vehicle to the recommended lane associated with the route to the destination acquired; and
when a travel lane of the vehicle is a merging lane that merges with a first road extending toward the destination direction and a distance from a point at which the travel lane merges with the first road to a point at which the lane change is required is less than or equal to a first prescribed distance, cause the output to output the guidance information before the vehicle joins the first road,
wherein the merging lane includes a lane with prescribed curvature for connecting the first road and a second road which three-dimensionally intersects the first road,
when the guidance information is output while the vehicle is traveling in the merging lane with the prescribed curvature, the processor causes a sound to be output by means of a speaker mounted on the vehicle or causes a vibrator mounted on the vehicle to generate vibrations,
when the guidance information is output while the vehicle is traveling in a merging lane that does not have the prescribed curvature, the processor causes display an image including the guidance information instead of or in addition to the sound and vibrations.

2. The information output device according to claim 1, wherein a lane connected to the merging lane included in the first road is a lane connected to a branch lane that branches from the first road.

3. The information output device according to claim 2, wherein, when a distance from a point at which the merging lane merges with the first road to a point at which the branch lane branches from the first road is less than or equal to a second prescribed distance, the processor causes the output to output the guidance information before the vehicle joins the first road.

4. The information output device according to claim 2, wherein, a distance in a direction in which the second road of the merging lane is extended is greater than a distance in a direction in which the first road of the merging lane and the branch lane is extended, the processor causes the output to output the guidance information before the vehicle joins the first road.

5. The information output device according to claim 4, wherein, when the branch lane is a lane with prescribed curvature connected to a lane included in the second road after branching from the first road, the processor further causes the output to output the guidance information before the vehicle joins the first road.

6. The information output device according to claim 1, the processor further executes instructions to:
recognize a travel situation of the vehicle,
wherein the processor causes the output to output the guidance information when a forward direction of the vehicle which is traveling in the merging lane recognized is at a prescribed angle with respect to an extending direction of the first road.

7. The information output device according to claim 1, wherein, when the travel lane of the vehicle is the merging lane that merges with the first road and a lane included in the first road connected to the merging lane included in the first road is a lane connected to a branch lane that branches from the first road, the processor derives a distance from a point at which the merging lane merges with the first road to a point at which the branch lane branches from the first road, and wherein, when the derived distance is within a prescribed distance, the processor causes the output to output the guidance information before the vehicle joins the first road.

8. The information output device according to claim 1, wherein, when the travel lane of the vehicle is the merging lane that merges with the first road, the merging lane is a lane for connecting the first road and the second road which three-dimensionally intersects the first road, a lane connected to the merging lane included in the first road is a lane connected to a branch lane that branches from the first road, a distance in a direction in which the second road of the merging lane is extended is greater than a distance in a direction in which the first road of the merging lane and the branch lane is extended, the processor causes the output to output the guidance information before the vehicle joins the first road.

9. The information output device according to claim 1, wherein the travel lane of the vehicle on the first road that merges with the merging lane becomes a branch lane that branches off from the first road within a predetermined distance.

10. An output control method comprising:
acquiring, by a computer, a route to a destination of a vehicle and a recommended lane associated with the route to the destination based on the position information of the vehicle and map information determined by a navigation device;
causing, by the computer, an output to output a guidance information for guiding an occupant to make a lane change from a travel lane of the vehicle to the recommended lane associated with the acquired route to the destination; and
causing, by the computer, when a travel lane of the vehicle is a merging lane that merges with a first road extending toward the destination direction and a distance from a point at which the travel lane merges with the first road to a point at which the lane change is required is less than or equal to a first prescribed distance, the output to output the guidance information before the vehicle joins the first road,
wherein the merging lane includes a lane with prescribed curvature for connecting the first road and a second road which three-dimensionally intersects the first road,
when the guidance information is output while the vehicle is traveling in the merging lane with the prescribed curvature, causing a sound to be output by means of a speaker mounted on the vehicle or causing a vibrator mounted on the vehicle to generate vibrations,
when the guidance information is output while the vehicle is traveling in a merging lane that does not have the prescribed curvature, causing display an image including the guidance information instead of or in addition to the sound and vibrations.

11. A computer-readable non-transitory storage medium storing a program for causing a computer to:
acquire a route to a destination of a vehicle and a recommended lane associated with the route to the destination based on the position information of the vehicle and map information determined by a navigation device;
cause an output to output a guidance information for guiding an occupant to make a lane change from a travel lane of the vehicle to the recommended lane associated with the acquired route to the destination; and
cause, when a travel lane of the vehicle is a merging lane that merges with a first road extending toward the destination direction and a distance from a point at which the travel lane merges with the first road to a point at which the lane change is required is less than or equal to a first prescribed distance, the output to output the guidance information before the vehicle joins the first road;
wherein the merging lane includes a lane with prescribed curvature for connecting the first road and a second road which three-dimensionally intersects the first road,
when the guidance information is output while the vehicle is traveling in the merging lane with the prescribed curvature, cause a sound to be output by means of a speaker mounted on the vehicle or cause a vibrator mounted on the vehicle to generate vibrations,
when the guidance information is output while the vehicle is traveling in a merging lane that does not have the prescribed curvature, cause display an image including the guidance information instead of or in addition to the sound and vibrations.

12. An information output device comprising:
a processor that executes instructions to:
acquire a route to a destination of a vehicle and a recommended lane associated with the route to the destination based on the position information of the vehicle and map information determined by a navigation device;
cause the output to output a guidance information for guiding an occupant to make a lane change from a travel lane of the vehicle to the recommended lane associated with the route to the destination acquired;
recognize a travel situation of the vehicle; and
when a travel lane of the vehicle is a merging lane that merges with a first road extending toward the destination direction and a distance from a point at which the travel lane merges with the first road to a point at which the lane change is required is less than or equal to a first prescribed distance, causes the output to output the guidance information before the vehicle joins the first road,
wherein the processor recognizes a forward direction of the vehicle traveling in the merging lane, and causes the output to output the guidance information in a case that an angle of the forward direction of the vehicle with respect to the direction of extension of the first road is less than or equal to a prescribed angle,
wherein the merging lane is a lane with prescribed curvature for connecting the first road and a second road which three-dimensionally intersects the first road,
wherein when outputting the guidance information, the processor causes the output to display an image including the guidance information.

* * * * *